(12) United States Patent  
Smith

(10) Patent No.: US 6,579,054 B2  
(45) Date of Patent: Jun. 17, 2003

(54) SHAPE-MODIFIABLE TRANSITION CHUTE FOR TRAILER TIPPER

(75) Inventor: Harlan B. Smith, Hillsboro, OR (US)

(73) Assignee: Columbia Trailer Co., Inc., Hillsboro, OR (US)

( * ) Notice: Subject to any disclaimer, the term of this patent is extended or adjusted under 35 U.S.C. 154(b) by 0 days.

(21) Appl. No.: 09/908,788

(22) Filed: Jul. 18, 2001

(65) Prior Publication Data

US 2003/0017033 A1 Jan. 23, 2003

(51) Int. Cl.7 .............................................. B65G 67/30

(52) U.S. Cl. ........................ 414/362; 414/368; 414/385; 414/386; 414/582

(58) Field of Search ............................. 193/25 A, 25 C; 298/7; 414/368, 382, 385, 386, 471, 577, 582, 809, 362, 365, 376, 381; 222/108, 109

(56) References Cited

U.S. PATENT DOCUMENTS

| 4,772,072 A | * | 9/1988 | Vick, Jr. .................. 222/108 X |
| 5,046,774 A | * | 9/1991 | Stockell et al. ......... 222/108 X |
| 5,664,822 A | * | 9/1997 | Rosenfield ................. 296/39.2 |
| 6,019,568 A | * | 2/2000 | Bratlie .................... 414/368 X |

* cited by examiner

*Primary Examiner*—Steven A. Bratlie  
(74) *Attorney, Agent, or Firm*—Kolisch Hartwell, P.C.

(57) ABSTRACT

A trailer tipper is disclosed for dumping material from the rear of a trailer which includes a main frame, a tipping deck mounted at one end of the main frame for supporting the trailer during pivotal movement of the tipping deck from a lowered position to a raised position for dumping the material from the back end of the trailer, a spill chute for receiving material discharged onto the tipping deck during pivotal movement thereof and a shape-modifiable transition chute connected to the tipping deck and the spill chute modifiable by pivotal movement of the tipping deck from a first configuration when the tipping deck is in the lowered position to a second configuration when the tipping deck is pivoted to the raised position.

14 Claims, 3 Drawing Sheets

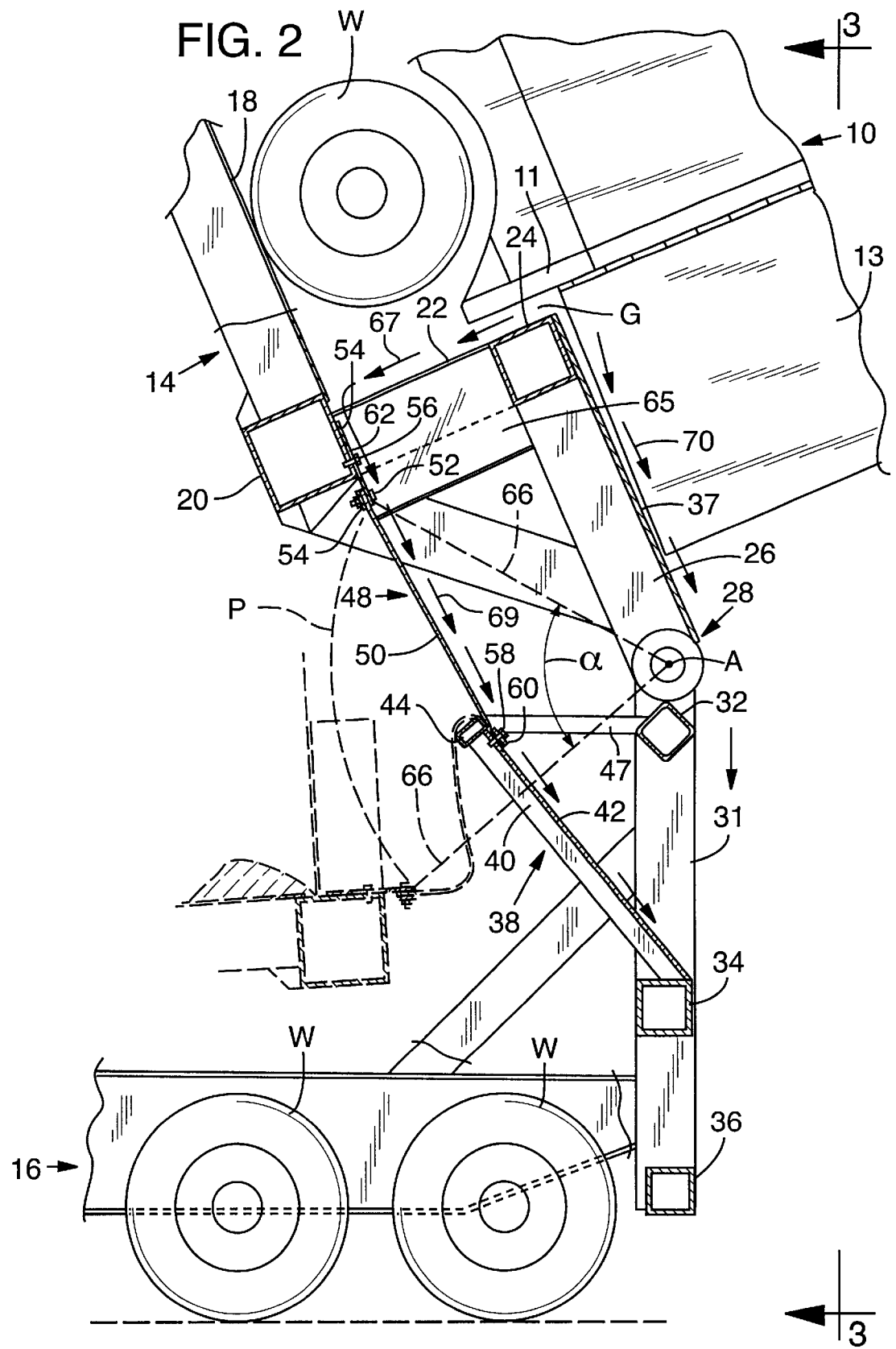

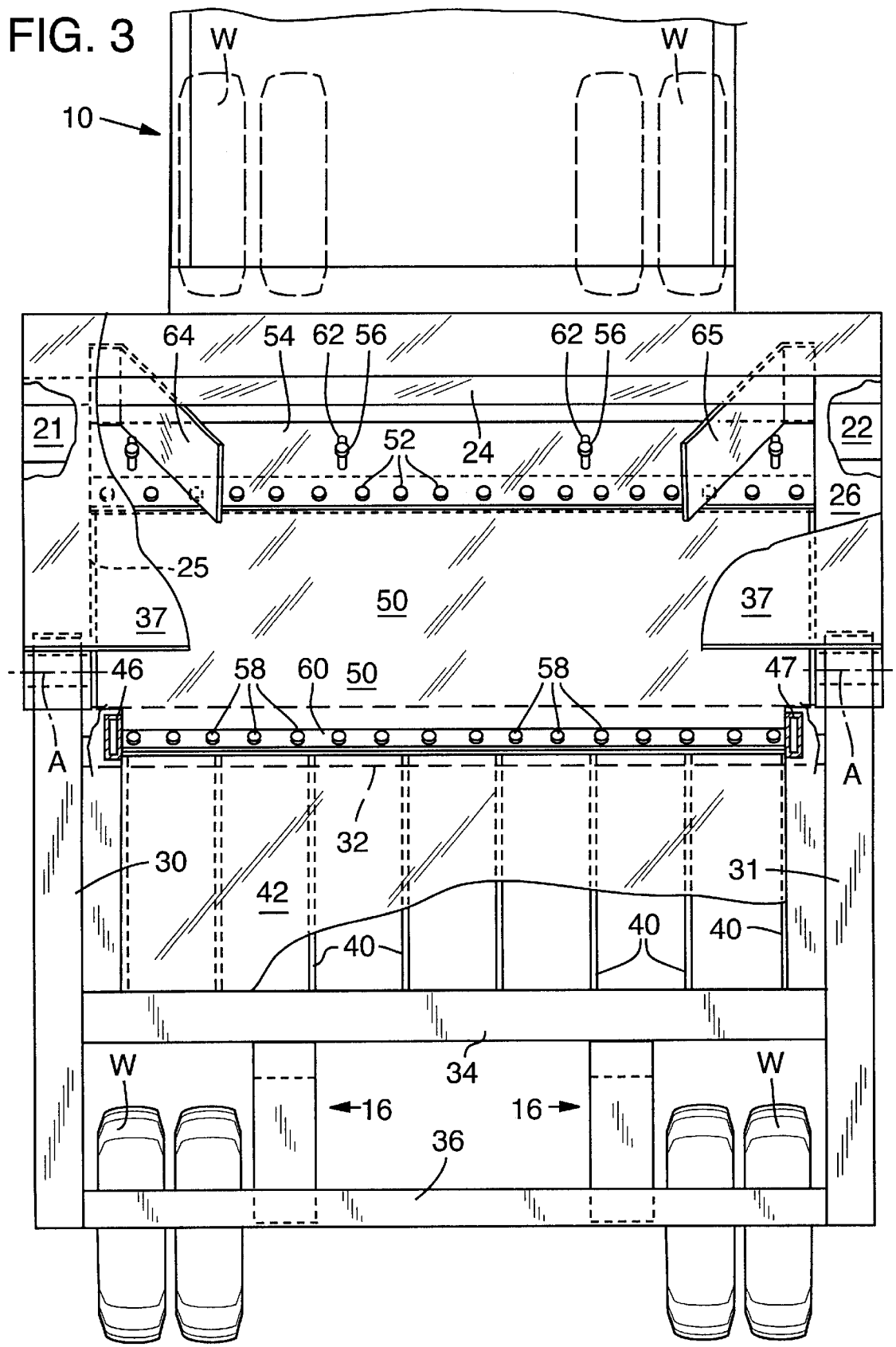

SHAPE-MODIFIABLE TRANSITION CHUTE FOR TRAILER TIPPER

BACKGROUND OF THE INVENTION

The present invention relates to so-called "trailer tippers," apparatuses designed for simultaneously hoisting and tilting a trailer backward so that material in the trailer is discharged or dumped from its back end. Trailer tippers generally take the form of large, welded steel structures which include an elongate main frame for supporting a tipping platform or deck which is pivotally connected at one end thereof to the main frame, movable between a first lowered position to a second tilted or raised position. The tipping deck is dimensioned for receiving a large trailer loaded with material, such as refuse, to be dumped, and the sequence of operation is generally as follows.

The driver of a tractor-trailer rig backs the trailer onto the tipping deck when it is lowered, unhooks the trailer to leave it there and drives the tractor off. An operator (which may or may not be the driver) operates power-driven actuators connected to the tipping deck to pivot it upwardly to a tilt angle of approximately 60–70° relative to the horizontal so that material from the trailer is discharged through its open-doored back end and dumped onto the ground at a selected dump site. Trailer tippers have found successful application for discharging loads from refuse trailers at large landfills and other refuse sites, as well as for dumping aggregate and other materials at construction and building sites and staging areas.

Examples of trailer tippers are shown in U.S. Pat. Nos. 5,080,548; 5,344,271; 5,458,451 and 6,019,568. In the '568 patent, there is disclosed a spill gate for a trailer tipper which is connected to the rear of the tipping deck operable for being selectively positioned to engage the spill chute on the main frame when the tipping deck is tipped upwardly. The purpose of the spill gate disclosed in the '568 patent is to direct material spilled from the trailer and accumulated on the tipping deck to the spill chute, as the deck is raised into dumping position. The spill gate design serves as a supplemental chute to guide material away from the main frame when the tipping deck is raised to the dumping position. The spill gate disclosed in the patent is a flat, nondeformable, rigid plate which is pivotally mounted at a bottom edge thereof to a cross beam at the rear of the tipping deck, and spans across the width of the spill chute. A hydraulic cylinder connected to the cross beam has its rod connected to the spill gate, and is operable for pivoting the spill gate about its pivot connection to the cross beam.

The spill gate disclosed in the '568 patent operates to remove spillage from the tipping deck and main frame generally as follows. The tipping deck is initially positioned in its stowed or lowered position and a trailer is backed thereonto, after which the tractor is uncoupled and driven off the tipping deck. The hydraulic cylinder which operates to position the spill gate is retracted to orient the spill gate substantially vertically. As the tipping deck is pivoted upwardly, an operator must sequentially actuate the hydraulic cylinder to extend its rod so that the spill gate is pivoted about its pivot connection, in an opposite sense to the tipping deck, to engage the top of the upper end of the spill chute. As the tipping deck continues to be raised, the operator continuously extends the rod of the spill gate actuator so that the spill gate maintains a path for directing any overflow material from the tipping deck onto the spill chute.

While the spill gate construction disclosed in the '568 patent provides an adequate way for disposing of material inadvertently built up or spilled onto the tipping deck from being subsequently spilled onto the main frame, it does require operator attention for trouble-free operation. Not only must an operator control the spill gate during raising of the tipping deck, but also must sequentially retract the spill gate from its extended position during lowering of the tipping deck. If the operator neglects to actuate the spill gate to rotate it away from the spill chute during lowering, the spill chute will be forced against the spill gate.

Because of the significant weight of the trailer and tipping deck, and because the spill chute is rigidly mounted on the main frame, the spill gate can be damaged, or in the extreme, torn away from its mounting to the tipping deck. And two operators may be necessary; one to control raising and lowering of the tipping deck about its pivotal connection to the main frame, and another simultaneously to operate the spill gate actuator for extension and retraction of the spill gate. Because the spill gate and its actuator are both pivotally connected to the tipping deck, and because movable parts such as a hydraulic rod are involved, material which has accumulated on the tipping deck can foul these components over time. Maintenance and repair of the hydraulic components and the pivot connections must be ongoing, particularly in applications where refuse is being dumped.

SUMMARY OF THE INVENTION

The present invention is directed to providing a novel shape-modifiable transition chute formed of flexible material to replace the spill gate shown in the '568 patent and facilitate transfer of accumulated spillage from the tipping deck to the spill chute. In accordance with the present invention, the transition chute includes a flexible member connected both to the rear of the tipping deck and to the upper end of the spill chute. The flexible or shape-modifiable nature of the transition chute enables it to remain continuously connected to the tipping deck and the spill chute during all phases of pivotal movement of the tipping deck from its lowered to its raised positions.

When the tipping deck is in its stowed or lowered position, the transition chlute is partially deformed or bent to a collapsed configuration, owing to the flexible nature of its material. As the tipping deck is raised or tilted upwardly, it moves about its pivot connection to the main frame, simultaneously swinging the end of the transition chute, connected to the tipping deck, along an arcuate path. As the tipping deck finally reaches its ultimate diagonal or tilted position, relative to the ground, the shape of the flexible transition chute has expanded from its initial, partially collapsed first configuration to a second configuration, defining a substantially planar expanse which presents a smooth, inclined and somewhat resilient surface for receiving and directing material which has been spilled onto the tipping deck to be directed downwardly onto the spill chute for further egress.

The flexible or shape-modifiable nature of the transition chute enables it to be easily installed and readily maintained, as well as being retrofitted onto existing trailer tippers. If for some reason the transition chute becomes torn or otherwise damaged and needs repair or replacement, it can readily be detached and a substitute installed. The flexible nature of the transition chute also provides the additional advantage of shock absorption. As heavy and large chunks of material, such as refuse material, collide with the transition chute in its intermediate or raised positions, the transition chute may flex or give, and provides a resilient, as opposed to rigid, surface.

The shape-modifiable transition chute of the present invention may be made of readily available materials, such as rubberized conveyor belt material or rubber or vinyl belts could be used, so long as they were sufficiently thick and resilient to withstand material impact.

BRIEF DESCRIPTION OF THE DRAWINGS

FIG. 2 is a view showing the tipping deck extended to its raised position to expand the flexible transition chute into a substantially planar expanse; and FIG. 3 is an end view taken along lines 3—3 of FIG. 2, and shows details of the mounting of the flexible transition chute to the tipping deck and the spill chute.

Figure 1:
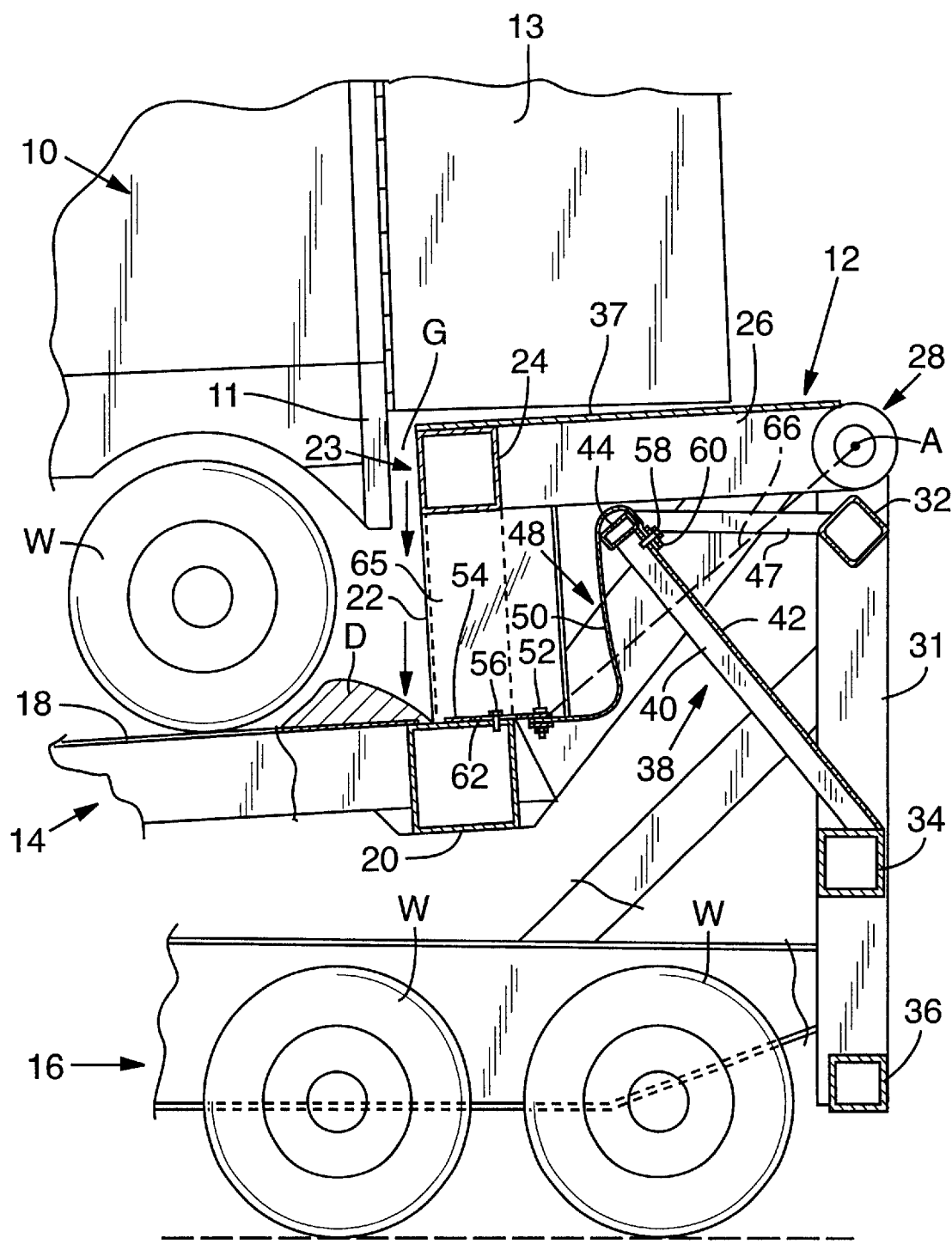
FIG. 1 is a fragmentary side elevational view, with parts broken away showing a trailer positioned on top of a trailer tipper apparatus with the tipping deck in its stowed or lowered position, with the flexible transition chute of the present invention deployed in a partially collapsed configuration.

DETAILED DESCRIPTION OF THE PREFERRED EMBODIMENT AND BEST MODE OF CARRYING OUT THE INVENTION

As mentioned previously, the shape-modifiable transition chute of the present invention is provided so that material which has been spilled from the back of a trailer onto a tipping deck and accumulated thereon can be redirected to a spill chute, which directs the material outwardly from the back of the main frame of a trailer tipper. When a trailer is backed onto a tipping deck, the driver often cannot position the back end of the trailer so that it is held against the backstop of the tipping deck. Debris built up on the tipping deck may block the rear wheels of the trailer so that its back end cannot reach the backstop. Moreover, the trailer usually will lurch forward when the brakes on the tractor are set, and in any case, a space or gap is then left between the back end of the trailer and the backstop, which creates an opening through which material can be spilled when the rear doors to the trailer are opened, even before the tipping deck is raised.

As shown in FIG. 1, which is a fragmentary view, a trailer, generally indicated at 10, is shown backed onto a trailer tipper, generally indicated at 12, and material debris is shown at D. Trailer tipper 12 is constructed with an elongate tipping deck, generally indicated at 14, pivotally mounted at one end thereof to an elongate main frame, generally indicated at 16, for rotation about a pivot axis A. Typically, the main frame is a wheeled unit, so that it can be transported intrasite or moved site-to-site. Wheels of the trailer and main frame are shown at W. Details of a trailer tipper in complete views are set forth in U.S. Pat. No. 6,019,568 and those details are incorporated by reference here.

As shown in FIG. 1, trailer 10 has been backed up onto tipping deck 14. The tipping deck, fabricated of welded steel, includes elongate rails, one of which is shown at 18. The rails are interconnected by cross beams, one of which is shown at 20, and the rear end of the tipping deck provides a backstop, generally indicated at 23, formed by opposed spaced-apart vertical posts, 21 and 22 (see FIG. 3 also), in turn connected to another cross beam indicated at 24. Extending rearwardly from cross beam 24 are spaced-apart pivot arms 25 and 26 (see FIG. 3 also), journaled to a pivot assembly generally indicated at 28 which is mounted on spaced-apart uprights 30 and 31 extending from the rear of main frame 16. Additional cross members or beams, such as indicated at 32, 34 and 36 are provided for rigidifying and tying the pivot assembly together. A large plate 37 is mounted on pivot arms 25 and 26 to span therebetween and provide a sliding surface for material dumped from the trailer.

An inclined spill chute, generally indicated at 38, is formed by a plurality of spaced-apart supporting channels, indicated at 40 in FIGS. 1–3, upon which is mounted a plate 42. The channels and plate 42 extend across the width of the rear of the main frame and are shown in FIG. 3, in which plate 42 has been broken away for purposes of illustration. The channels are mounted to incline forwardly from cross member 34 at approximately a 45° angle from the horizontal, and are tied together at their upper ends by a rectangular tube 44. Spaced-apart brackets 46 and 47, as shown in FIG. 3, provide additional structural support.

As shown in FIG. 1, a shape-modifiable transition chute, generally indicated at 48, consists of an expanse of flexible material, defining a flexible member, indicated at 50. The flexible member may be, for example, fabricated of rubberized conveyor belt material, for example, $7/16$ to $1/2$-inch thick, 3 ply, 375 pylon, with a $3/16$-inch rubber topcover and a $1/16$-inch rubber bottom. Flexible member 50 is connected both to the tipping deck and the spill chute, and for example, may be dimensioned about 48 inches wide by 142 inches in length. A first end portion of flexible member 50 is connected to cross beam 20 by bolts 52 which are secured to a laterally-extending slotted flat bar or plate 54 by bolts 56, which are mounted to cross beam 20. The slots are shown at 62, and facilitate final positioning of the flexible member during its installation. The other end portion of flexible member 50 is connected to the end of spill chute 38 by a plurality of spaced-apart bolts 58 which sandwich the end of the flexible member 50 between a laterally-extending flat bar 60 and plate 42 of the spill chute.

As shown in FIG. 3, which is a rear view of the trailer tipper when it is in its upper or raised position, laterally-extending plate 54 is provided with a plurality of slots, such as indicated at 62. The slots are provided so that flexible belt 50 can shift, along the longitudinal axes defined by slots 62, prior to bolts 56 being cinched down during installation to secure flexible member 50 to cross member 20 at the rear of tipping deck 14.

As mentioned previously, it is the combination of spill chute 38 and flexible member 50 of transition chute 48 that directs material inadvertently discharged or spilled onto the tipping deck when trailer doors are opened and/or when the tipping deck is pivoted upwardly. This material, indicated at D, accumulates on the tipping deck because it is difficult to back trailer 10 so that its rear end, indicated at 11, abuts against backstop 23. When a driver backs trailer 10 onto tipping deck 14, the goal is to position the back end of the trailer, indicated at 11, against backstop 22, so that a gap does not exist. However, even if the driver does achieve close positioning between back end 11 and the backstop, the tractor will inevitably lurch forward when its brakes are set, leaving a gap G between the back end of the trailer and the backstop. This gap presents an opening through which material can readily spill onto the tipping deck, when the trailer doors are opened initially, as well as when raising of the tipping deck is underway. The gap is maintained during upward pivotal movement of the tipping deck as shown in FIG. 2, and flexible member 50 of the transition chute provides an expanse for facilitating funneling or channeling of that material downwardly onto spill chute 38 for discharge to the rear of the trailer tipper.

OPERATION

Operation of the trailer tipper in a dump sequence and combined action of spill chute 38 and flexible member 50 of the transition chute will now be described, with reference initially directed to FIG. 1. As shown, tipping deck 14 is in its stowed or first lowered position and an operator of a tractor has backed trailer 10 into position, but debris D may prevent the back end of the trailer from engaging the backstop, or the trailer moves slightly forward when the tractor's brakes are set. With the tractor braked, the trailer is unhooked, and the tractor driven off the tipping deck. The trailer has been secured to the tipping deck, and its doors, such as door 13, are opened, prior to tilting or raising of the tipping deck. There may be residue material D from a prior load, spilled out inadvertently during backing up or when the trailer is pulled away.

In any case, as shown in FIG. 1, transition chute 48 with its flexible member 50 has assumed a first configuration whereby it is collapsed or at least partially collapsed, due to its shape-modifiable or flexible nature. An operator, which may be the operator of the tractor or rig, operates suitable controls and powered actuators (not shown) to tilt or raise tipping deck 14 upwardly, in this example clockwise, about pivot axis A. It will be noted that a line drawn from pivot axis A to the longitudinal axis of bolt 52, where it intersects flexible member 50, or generally to the end portion of the flexible member, defines a radius 66. As the tipping deck is pivotally moved or swung from its stowed or lowered position, as shown in FIG. 1, to its deployed or upper raised position shown in FIG. 2, the tipping deck will swing the end of flexible member 50 so that it translates along an arcuate path P defined by radius 66, and the angle α.

The system is designed so that the powered actuators (not shown) will raise the tilting deck to some optimal angle, generally in the range of 60–70°, relative to the horizontal. As the end of flexible member 50 translates along arcuate path P, it eventually reaches the upper position shown in FIG. 2, also represented by the angular displacement α. This pivotal movement modifies the shape of flexible member 50 from a bent or collapsed first configuration so that it assumes a substantially planar expanse in its second configuration as shown in FIG. 2. Material which continuously spills through gap G onto the tipping deck will be directed or discharged down the transport face of flexible member 50 for transfer to spill chute 38. This discharge path is indicated by the series of lines indicated at 67 and 69.

To further facilitate transfer and diversion of material toward flexible member 50 from the rear of the tipping deck, a deflector structure consisting of a pair of laterally opposed deflectors 64 and 65 are mounted to the tipping deck as shown. The deflectors are inclined inwardly or toward what may be thought of as the fall line of the material, and their lower ends are positioned adjacent the top edge portion of flexible member 450. They are formed as plates mounted adjacent backstop 23 to present a redirecting of material which may tend to spill to the sides from gap G, rather than straight down.

The present invention, which utilizes the shape-modifiable transition chute as described above, provides a very simple mechanism for continuously interconnecting a pivotally movable apparatus, such as the tipping deck, to a stationary apparatus such as the main frame. This continuous interconnection is achieved by a simple structure which has no requirement for mechanical or moving parts. The flexible connection ensures that tilting or upward raising of tipping deck 14 about pivot axis A sequentially reconfigures flexible member 50 from its collapsed or partially collapsed first configuration (as shown in FIG. 1) to its expanded second configuration defining a substantially planar expanse. That planar expanse enables material which would normally build up on tipping deck 14 to be transferred smoothly along flexible member 50 to spill chute 68.

In contrast to other mechanical systems which involve a spill gate operable by hydraulic mechanism, there is no requirement for a separate operation to orient the shape-modifiable transition chute. It is automatically reconfigured to its proper configuration as tilting deck 14 is swung upwardly. In mechanical systems, such as that shown in U.S. Pat. No. 6,019,568, it is necessary for an individual to operate the spill gate and if not properly executed, damage can occur. Moreover, with the present invention, assembly of the shape-modifiable transition chute or retrofitting an existing trailer tipper is straight forward. With the tilting deck in its lowered position, plate 54, which may be though of as an adjustment plate, is mounted onto cross member 20 by bolts 56 (see also FIG. 3) which are not cinched down until a test run with the tilting deck raised upwardly is completed. Slots 62 enable plate 54 to shift along the cross member until flexible member 50 becomes stretched or substantially planar, as shown in FIG. 2, whereupon bolts 56 can be cinched down.

When the tipping deck is lowered, flexible member 50 is deformed from its second configuration as a substantially planar expanse to at least a partially collapsed configuration as tipping deck 14 is lowered to its lowered position. During the lowering sequence, an end portion of flexible member 50 translates along arcuate path P in the opposite direction.

The shape-modifiable transition chute, by its nature, provides a certain amount of give, and will deform if heavy objects impact it during a dumping sequence. The flexible member gives, and this is important when the trailer tipper operates over many cycles for a long period of time, where heavy and continuous impact of refuse, including metal, aggregate, wood, rocks, etc., cause tremendous wear. If the flexible member should become torn or ripped, it can be easily replaced in a very short period of time, and no special tools are required.

I claim:

1. A trailer tipper for dumping material from the rear of a trailer, the trailer tipper comprising:
    a main frame;
    a tipping deck mounted at one end of the main frame for supporting the trailer during pivotal movement of the tipping deck from a lowered position to a raised position for dumping the material from the back end of the trailer;
    a spill chute for receiving material discharged onto the tipping deck during pivotal movement thereof;
    a shape-modifiable transition chute connected to the tipping deck and the spill chute modifiable by pivotal movement of the tipping deck from a first configuration when the tipping deck is in the lowered position to a second configuration when the tipping deck is pivoted to the raised position;
    wherein the transition chute is continuously connected to the tipping deck and spill chute during pivotal movement of the tipping deck; and
    further wherein the transition chute is substantially inclined in the second configuration to facilitate channeling the material discharged onto the tipping deck downwardly onto the spill chute.

2. The trailer tipper of claim 1 wherein the transition chute is a flexible member having one end portion thereof connected to the tipping deck and the other end portion thereof connected to the spill chute.

3. The trailer tipper of claim 2 wherein the end portion of the flexible member connected to the tipping deck translates along an arcuate path when the tipping deck is pivotally moved from its lowered position to its raised position and returned.

4. The trailer tipper of claim 3 wherein pivotal movement of the tipping deck from its lowered position to its raised position modifies the shape of the flexible member from its first configuration to a second configuration whereby the flexible member assumes a substantially planar expanse to receive material accumulated on the tipping deck and facilitate transfer of the material to the spill chute.

5. The trailer tipper of claim 4 wherein pivotal movement of the tipping deck from its raised position to the lowered position modifies the shape of the flexible member from its second configuration to return to its first configuration where the flexible member is at least partially nonplanar.

6. The trailer tipper of claim 5 wherein a deflector structure is mounted adjacent the end portion of the flexible member connected to the tipping deck for directing material transferred to the flexible member to the spill chute.

7. A trailer tipper for dumping material from the rear of a trailer, the trailer tipper comprising:

a main frame;

a tipping deck mounted at one end of the main frame for supporting the trailer during pivotal movement of the tipping deck from a lowered position to a raised position for dumping the material from the back end of the trailer;

a spill chute for receiving material discharged onto the tipping deck during pivotal movement thereof;

the improvement comprising: a flexible member having one end portion thereof connected to the tipping deck and the other end portion thereof connected to the spill chute, the flexible member being movable by pivotal movement of the tipping deck from the lowered position to the raised position;

wherein the flexible member is continuously connected to the tipping deck and the spill chute during pivotal movement of the tipping deck; and further wherein the flexible member is substantially inclined when the tipping deck is in the raised position to facilitate channeling the material discharged onto the tipping deck downwardly onto the spill chute.

8. The trailer tipper of claim 7 wherein the end portion of the flexible member connected to the tipping deck translates along an arcuate path when the tipping deck is pivotally moved from its lowered position to its raised position and returned.

9. The trailer tipper of claim 8 wherein pivotal movement of the tipping deck from its lowered position to its raised position modifies the shape of the flexible member from a first configuration to a second configuration whereby the flexible member assumes a substantially planar expanse to receive material accumulated on the tipping deck and facilitate transfer of the material to the spill chute.

10. A method for facilitating removal of material accumulated on the tipping deck of a trailer tipper, where the trailer tipper includes a main frame supporting the tipping deck and a spill chute mounted adjacent the tipping deck, the method comprising the steps of:

providing a shape-modifiable transition chute between the tipping deck and the spill chute for transferring material therebetween;

pivotally moving the tipping deck relative to the horizontal to tilt a trailer mounted thereon from a first lowered position to a second raised position; and modifying the shape of the transition chute during pivotal movement of the tipping deck from the first lowered position to the second raised position.

11. The method of claim 10, wherein the modifying step includes translating one end of the transition chute along an arcuate path.

12. The method of claim 11 wherein the modifying step includes modifying the shape of the flexible member to a substantially planar expanse.

13. The method of claim 12, including the additional step of modifying the transition chute from its configuration as a substantially planar expanse to at least a partially collapsed configuration as a tipping deck is lowered to its lowered position.

14. The method claim 13, wherein the step of deforming the transition chute includes translating one end of the transition chute in an opposite direction along the arcuate path as the tipping deck is lowered.

* * * * *